(12) United States Patent
Bertz et al.

(10) Patent No.: US 11,452,007 B1
(45) Date of Patent: Sep. 20, 2022

(54) WIRELESS COMMUNICATION HANDOVERS FOR NON-THIRD GENERATION PARTNERSHIP PROJECT (NON-3GPP) ACCESS NODES

(71) Applicant: T-Mobile Innovations LLC, Overland Park, KS (US)

(72) Inventors: Lyle T. Bertz, Lee's Summit, MO (US); Robert Keith Butler, Overland Park, KS (US); Brian David Waters, Angel Fire, NM (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 17/203,086

(22) Filed: Mar. 16, 2021

(51) Int. Cl.
*H04W 36/00* (2009.01)

(52) U.S. Cl.
CPC .............................. *H04W 36/0033* (2013.01)

(58) Field of Classification Search
CPC .................................................. H04W 36/0033
See application file for complete search history.

(56) References Cited

U.S. PATENT DOCUMENTS

| | | | |
|---|---|---|---|
| 8,971,182 B2 | 3/2015 | Lee et al. | |
| 9,420,503 B2 | 8/2016 | Taneja et al. | |
| 9,462,515 B2 | 10/2016 | Wang et al. | |
| 9,894,586 B2 | 2/2018 | Sirotkin et al. | |
| 2015/0189557 A1 | 7/2015 | Touati et al. | |
| 2015/0249950 A1 | 9/2015 | Teyeb et al. | |
| 2016/0135100 A1 | 5/2016 | Teyeb et al. | |
| 2016/0219473 A1 | 7/2016 | Teyeb et al. | |
| 2019/0116631 A1* | 4/2019 | Talebi Fard | ........... H04W 76/11 |
| 2020/0053083 A1* | 2/2020 | Kunz | ................... H04L 63/0892 |
| 2020/0228940 A1* | 7/2020 | Huang | ..................... H04L 51/38 |
| 2020/0374698 A1* | 11/2020 | Ying | ...................... H04W 12/06 |
| 2021/0258869 A1* | 8/2021 | Di Girolamo | ......... H04W 48/16 |

FOREIGN PATENT DOCUMENTS

| | | |
|---|---|---|
| WO | 2018232253 A1 | 12/2018 |
| WO | 2019104357 A1 | 5/2019 |

OTHER PUBLICATIONS

"5G; Procedures for the 5G System (5GS) (3GPP TS 23.502 version 16.7.1 Release 16)"; Technical Specification Jan. 2021; pp. 1-606; ETSI TS 123 502 V16.7.1; 3GPP; Sophia Antipolis Cedex, France.

* cited by examiner

*Primary Examiner* — Barry W Taylor

(57) ABSTRACT

A wireless communication network hands-in inbound User Equipment (UE) from a source communication network to a non-Third Partnership Project (non-3GPP) access node. In the wireless communication network, a Network Exposure Function (NEF) receives inbound UE context from the source communication network. An Access and Mobility Management Function (AMF) detects when the inbound UE attaches to the non-3GPP access node to hand-in from the source communication network and responsively transfers a UE context request for the inbound UE to the NEF. The NEF transfers the inbound UE context to the AMF in response to the UE context request. The AMF transfers network signaling to one or more network functions to serve the inbound UE based on the inbound UE context.

20 Claims, 14 Drawing Sheets

WIRELESS COMMUNICATION HANDOVERS FOR NON-THIRD GENERATION PARTNERSHIP PROJECT (NON-3GPP) ACCESS NODES

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications to support and use the wireless data services. For example, a robot may execute a machine-control application that communicates with a robot controller over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Access and Mobility Management Functions (AMFs), Session Management Functions (SMFs), Interworking functions (IWFs), User Plane Functions (UPFs), Policy Control Functions (PCFs), Network Exposure Functions (NEFs), and the like.

A wireless network core determines user context to control the wireless data services for a wireless user device. The user context indicates information like user Identifier (ID), device ID, network ID, access node ID, service ID, session ID, and individual session data. The individual session data characterizes items like network address, Access Point Name (APN), Data Network Name (DNN), Slice ID, Quality-of-Service Class Indicator (QCI), Quality-of-Service Flow Indicator (QFI), or some other session parameter. The wireless network cores transfer the user context to the wireless access nodes to control the wireless data services.

As the wireless user devices move about, the wireless access nodes handover the wireless user devices among one another. The wireless user devices detach from their serving wireless access nodes and attach to their target wireless access nodes. Some of the serving wireless access nodes transfer user context to the target wireless access nodes. Unfortunately, some of the wireless access nodes do not effectively transfer the user context. Moreover, the network cores inefficiently re-determine network context after some handovers.

TECHNICAL OVERVIEW

A wireless communication network hands-in inbound User Equipment (UE) from a source communication network to a non-Third Partnership Project (non-3GPP) access node. In the wireless communication network, a Network Exposure Function (NEF) receives inbound UE context from the source communication network. An Access and Mobility Management Function (AMF) detects when the inbound UE attaches to the non-3GPP access node to hand-in from the source communication network and responsively transfers a UE context request for the inbound UE to the NEF. The NEF transfers the inbound UE context to the AMF in response to the UE context request. The AMF transfers network signaling to one or more network functions to serve the inbound UE based on the inbound UE context.

DETAILED DESCRIPTION

Figure 1:
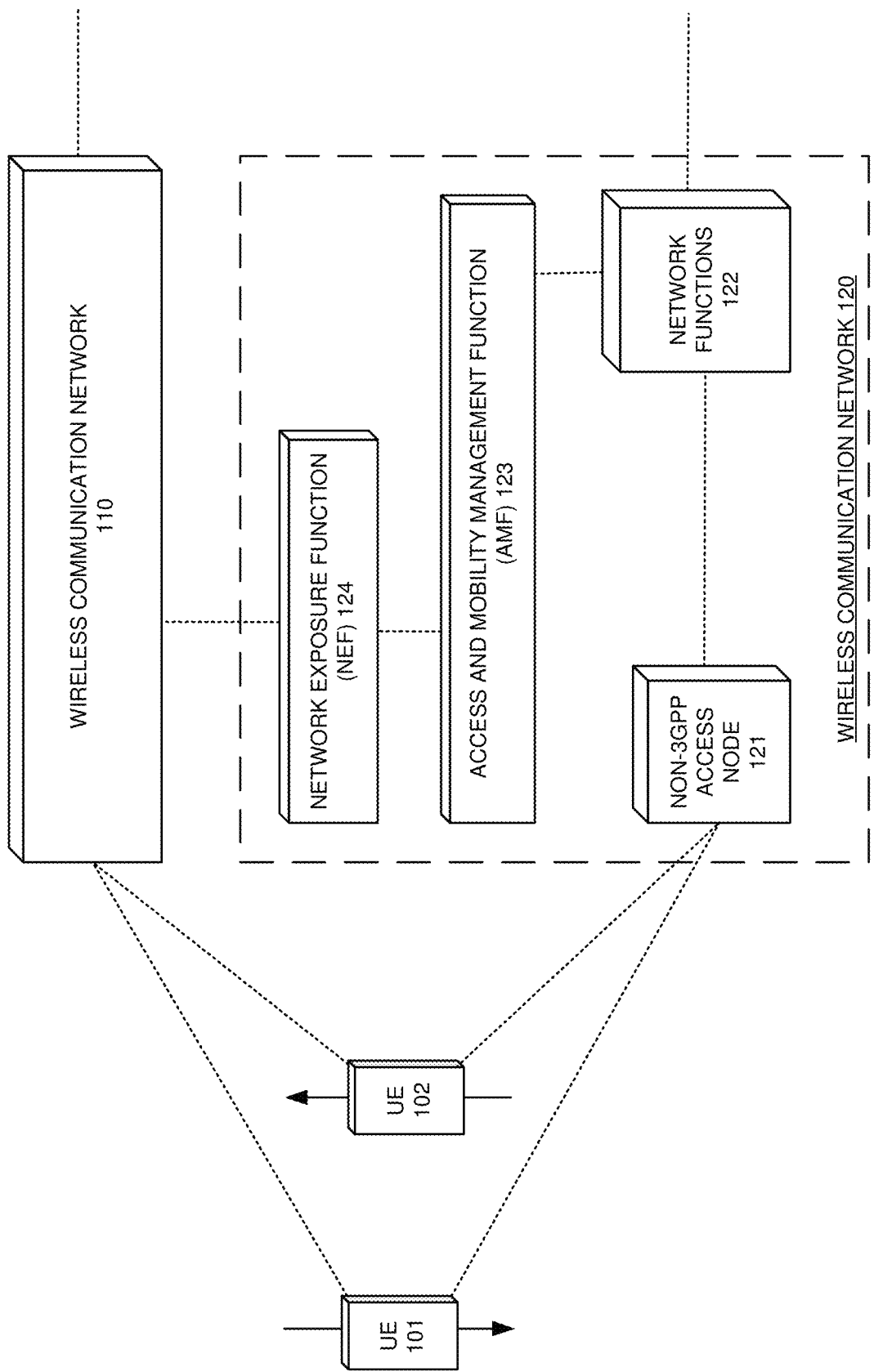
FIG. 1 illustrates a wireless communication network to handover User Equipment (UE) to and from a non-Third Partnership Project (non-3GPP) access node.

FIG. 1 illustrates wireless communication network 120 to handover User Equipment (UE) 101 from wireless communication network 110 to Non-Third Partnership Project (non-3GPP) access node 121 and to handover UE 102 from non-3GPP access node 121 to wireless communication network 110. UEs 101-102 comprise computers, phones, vehicles, sensors, robots, or some other data appliances with wireless possibly wireline communication circuitry. Wireless communication networks 110 and 120 deliver services to UEs 101-102 like internet-access, machine-control, media-streaming, or some other data communications product. Wireless communication network 120 comprises non-3GPP access node 121, network functions 122, Access and Mobility Management Function (AMF) 123, and Network Exposure Function (NEF) 124.

Various examples of network operation and configuration are described herein. In some examples, UE 101 is initially linked to wireless communication network 110, and UE 102 is initially linked to wireless communication network 120. UEs 101-102 are moving in opposite directions. Wireless communication network 110 determines UE context for UE 101 and wirelessly serves UE 101 based on the UE context. The UE context indicates information like user Identifier (ID), UE ID, network ID, access node ID, service IDs, session IDs, and individual session data. The individual session data characterizes items like network addresses, Access Point Name (APN), Data Network Name (DNN), Slice ID, Quality-of-Service Class Indicator (QCI), Quality-of-Service Flow Indicator (QFI), or some other session parameter. As UE 101 moves away from wireless communication network 110 and toward non-3GPP access node 121, UE 101 reports the poor signal strength from wireless communication network 110 and better signal strength from non-3GPP access node 121. In response to the UE report, wireless communication network 110 detects that UE 101 is handing-out to non-3GPP access node 121 in wireless communication network 120, and in response, wireless communication network 110 transfers the UE context to NEF 124. UE 101 attaches to non-3GPP access node 121 and registers with AMF 123 over non-3GPP access node 121 and network functions 122. UE 101 indicates the UE context to AMF 123 during the registration—although the UE context from a UE is not authorized. AMF 123 detects that UE 101 is handing-in from wireless communication network 110 to non-3GPP access node 121, and in response, AMF 123 transfers a UE context request for UE 101 and network 110 to NEF 124. NEF 124 transfers the UE context for UE 101 and network 110 to AMF 123 in response to the UE context request. AMF 123 processes the UE context and responsively generates network signaling. For example, AMF 123 may select a 5G network slice based on an LTE QCI. AMF 123 transfers the network signaling to network functions 122. Network functions 122 serve UE 101 based on the network signaling. Network functions 122 may transfer corresponding network signaling to non-3GPP access node 121, and node 121 may serve UE 101 based on the network signaling.

For UE 102, AMF 123 determines the UE context and signals the UE context for UE 102 to network functions 122. As UE 102 moves away from non-3GPP access node 121 and toward wireless communication network 110, UE 102 reports the poor signal strength from non-3GPP access node 121 and better signal strength from wireless communication network 110. In response to the UE report, AMF 123 detects that UE 102 is handing-out to wireless communication network 110, and in response, AMF 123 transfers the UE context to NEF 124. NEF 124 transfers the UE context for UE 102 to wireless communication network 110. UE 102 attaches to and registers with wireless communication network 110. UE 102 indicates the UE context to wireless communication network 110 during the registration—although UE context from a UE is not authorized. Wireless communication network 110 serves UE 102 based on the UE context from wireless communication 120.

In some examples, NEF 124 receives user instructions for UEs 101-102 from an Application Function (AF) that exerts external control for the user. NEF 124 transfers the user instructions for UE 101 to AMF 123 in response to the UE context request for UE 101. AMF 123 transfers the user instructions to UE 101 in N1 signaling. NEF 124 transfers the user instructions for UE 102 to wireless communication network 110 in response to delivering the UE context for UE 102 to wireless communication network 110.

Advantageously, NEF 124 effectively transfers the UE context between wireless communication networks 110 and 120 in response to handovers using non-3GPP access node 121. Moreover, wireless communication networks 110 and 120 efficiently re-use the network context after the handovers.

UEs 101-102 communicate with wireless communication networks 110 and 120 over technologies like Fifth Generation New Radio (5GNR), Long Term Evolution (LTE), Low-Power Wide Area Network (LP-WAN), Institute of Electrical and Electronic Engineers (IEEE) 802.11 (WIFI), IEEE 802.3 (ENET), Bluetooth, Narrowband Internet-of-Things (NB-IoT), Internet Protocol (IP), and/or some other data networking protocol. The wireless communication technologies use electromagnetic frequencies in the low-band, mid-band, high-band, or some other portion of the electromagnetic spectrum. The communication links that support these technologies use metallic links, glass fibers, radio channels, or some other communication media. The communication links use ENET, Time Division Multiplex (TDM), Data Over Cable System Interface Specification (DOCSIS), IP, General Packet Radio Service Transfer Protocol (GTP), 3GPP, 5GNR, LTE, WIFI, IP, virtual switching, inter-processor communication, bus interfaces, and/or some other data communication protocols.

In some examples, non-3GPP access node 121 is untrusted, and network functions 122 comprise a non-3GPP Interworking Function (IWF) and User Plane Function (UPF). UEs 101-102 communicate with AMF 123 over an N1 link that traverses the untrusted access node and the IWF. UEs 101-102 communicate with external systems over an NWu/N3/N6 link that traverses the untrusted access node, IWF, and UPF. In other examples, non-3GPP access node 121 comprises a Trusted Network Access Point (TNAP), and network functions 122 comprise a Trusted Network Gateway Function (TNGF) and UPF. UEs 101-102 communicate with AMF 123 over an N1 link that traverses the TNAP and TNGF. UEs 101-102 communicate with external systems over an NWt/N3/N6 link that traverses the TNAP, TNGF, and UPF.

UEs 101-102, wireless communication network 110, and non-3GPP access node 121 comprise antennas, amplifiers, filters, modulation, analog/digital interfaces, microprocessors, software, memories, transceivers, bus circuitry, and the like. Functions 122-124 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of UEs 101-102, network 110, and network 120 as described herein.

Figure 2:
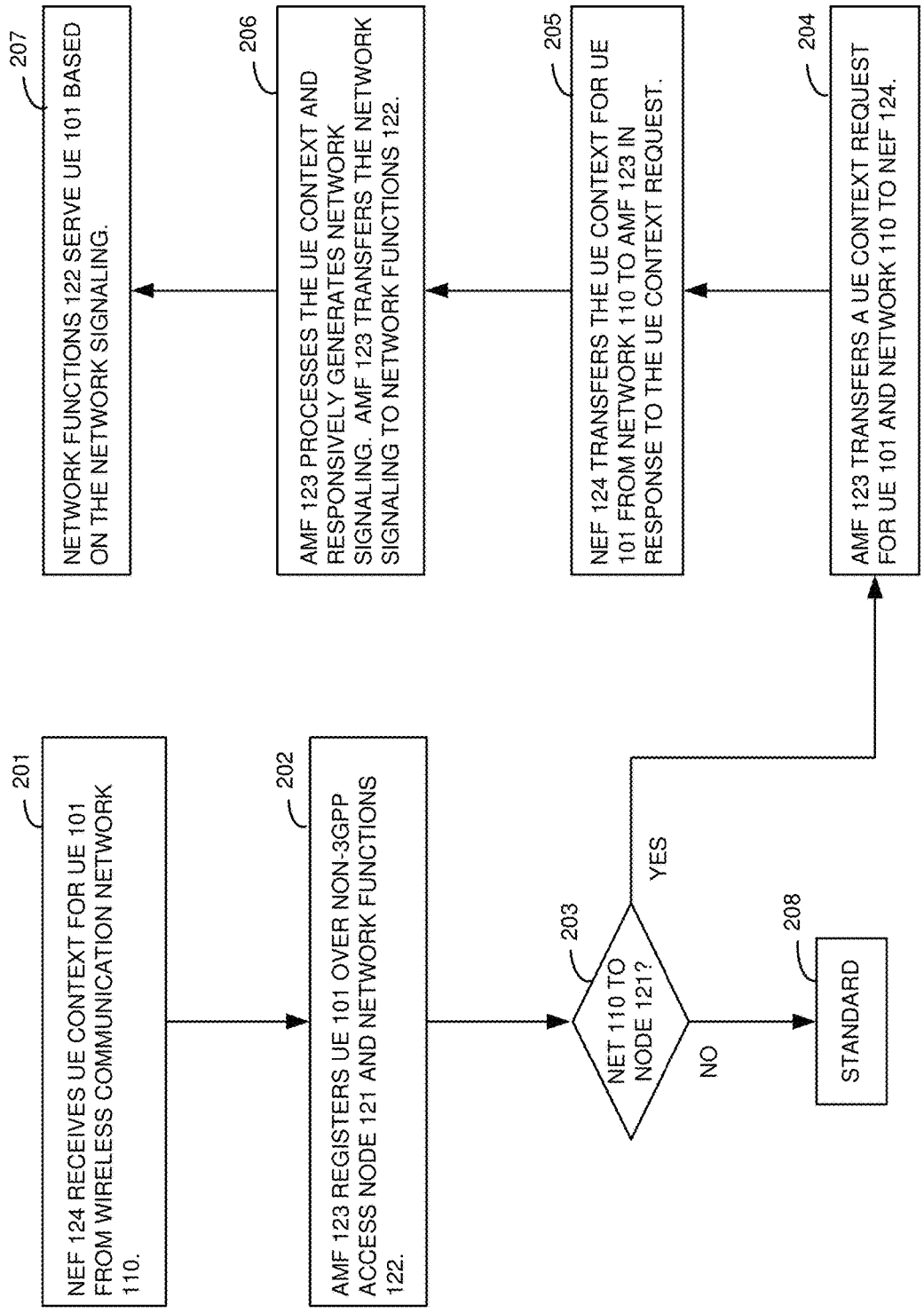
FIG. 2 illustrates an exemplary operation of the wireless communication network to handover the UE to the non-3GPP access node.

FIG. 2 illustrates an exemplary operation of wireless communication network 120 to hand-in UE 101 to non-3GPP access node 121. This operation is exemplary and may vary in other examples. NEF 124 receives UE context for UE 101 from wireless communication network 110 (201). AMF 123 registers UE 101 over non-3GPP access node 121 and network functions 122 (202). AMF 123 determines when UE 101 is handing-in from wireless communication network 110 (203). In response to the hand-in from network 110 to non-3GPP access node 121 (203), AMF 123 transfers a UE context request for UE 101 and network 110 to NEF 124 (204). NEF 124 transfers the UE context for UE 101 from network 110 to AMF 123 in response to the UE context request (205). AMF 123 processes the UE context and responsively generates network signaling (206). AMF 123 transfers the network signaling to network functions 122 (206). Network functions 122 serve UE 101 based on the network signaling (207). AMF 123 may use standard processing (208) when UE 101 is not handing-in from wireless communication network 110 (203).

Figure 3:
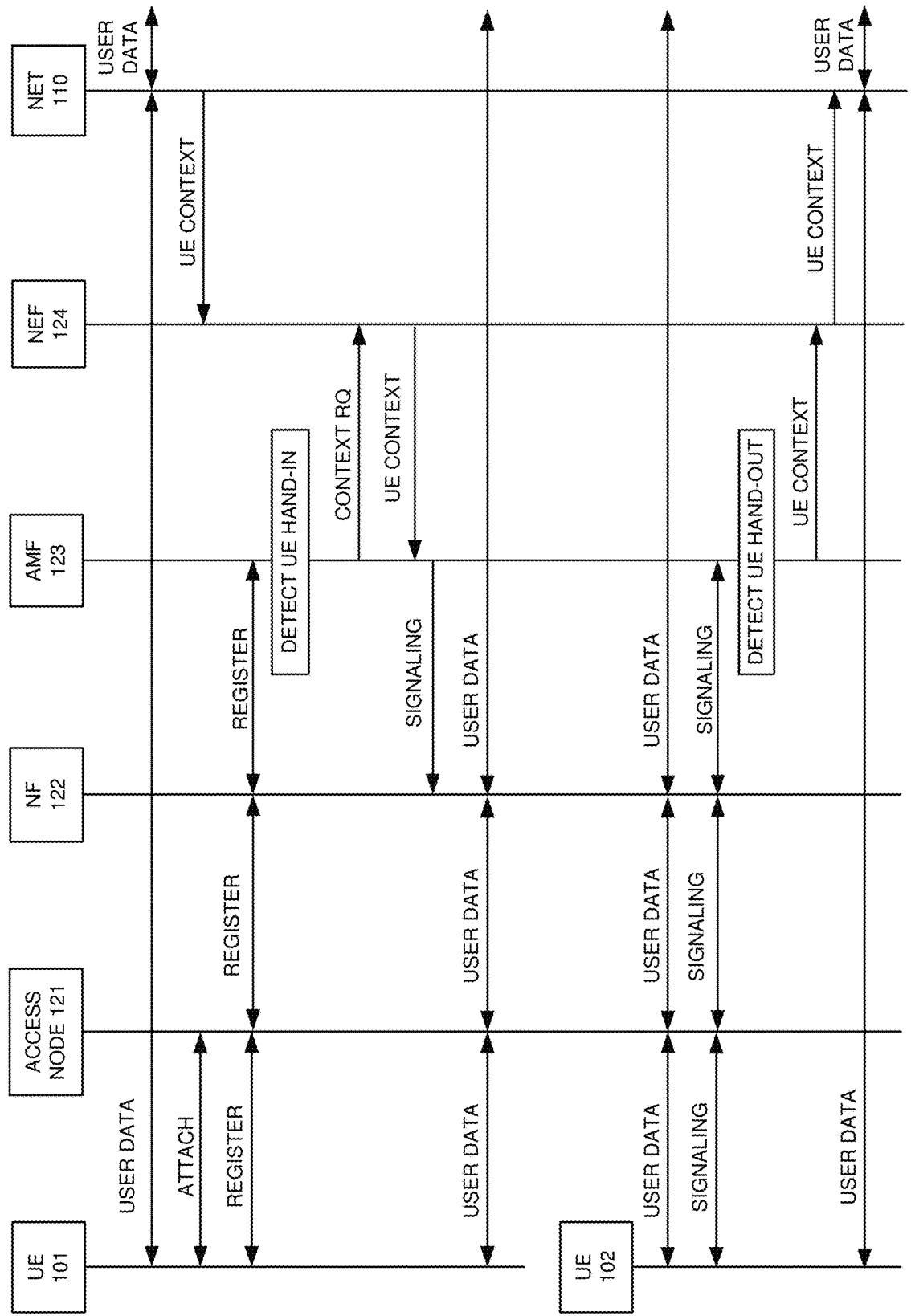
FIG. 3 illustrates an exemplary operation of the wireless communication network to handover the UE to the non-3GPP access node.

FIG. 3 illustrates an exemplary operation of wireless communication network 120 to hand-in UE 101 to non-3GPP access node 121 and to hand-out UE 102 from non-3GPP access node 121. This operation is exemplary and may vary in other examples. UE 101 and wireless communication network 110 exchange user data per UE context. The UE context indicates information like user ID, UE ID, network ID, access node ID, service IDs, session IDs, and individual session data for addresses, names, quality, and other session parameters.

Wireless communication network 110 identifies that UE 101 is handing-out to wireless communication network 120, and in response, network 110 transfers the UE context to NEF 124. UE 101 attaches to non-3GPP access node 121 and registers with AMF 123 over non-3GPP access node 121 and network functions 122. UE 101 indicates UE context to AMF 123 during the registration. AMF 123 processes the context to detect that UE 101 is handing-in from wireless communication network 110 to non-3GPP access node 121, and in response, AMF 123 transfers a UE context request (RQ) for UE 101 and network 110 to NEF 124. NEF 124 transfers the UE context for UE 110 and network 110 to AMF 123 in response to the UE context request. AMF 123 processes the UE context and responsively transfers the network signaling to network functions 122. UE 101 and network functions 122 exchange user data over non-3GPP access node 121 per the network signaling which is based on the UE context from wireless communication network 110.

For UE 102, AMF 123 determines the UE context and signals the UE context to network functions 122. The UE context indicates information like user ID, UE ID, network ID, access node 121 ID, service ID, session IDs, and individual session data. As UE 102 moves away from non-3GPP access node 121 and toward wireless communication network 110, UE 102 reports poor signal strength from non-3GPP access node 121 and better signal strength from wireless communication network 110. In response to the UE report, AMF 123 detects that UE 102 is handing-out to wireless communication network 110, and in response, AMF 123 transfers the UE context for UE 102 to NEF 124 for delivery to wireless communication network 110. NEF 124 transfers the UE context for UE 102 to wireless communication network 110. UE 102 and wireless communication network 110 exchange user data per the UE context from wireless communication network 120.

Figure 4:
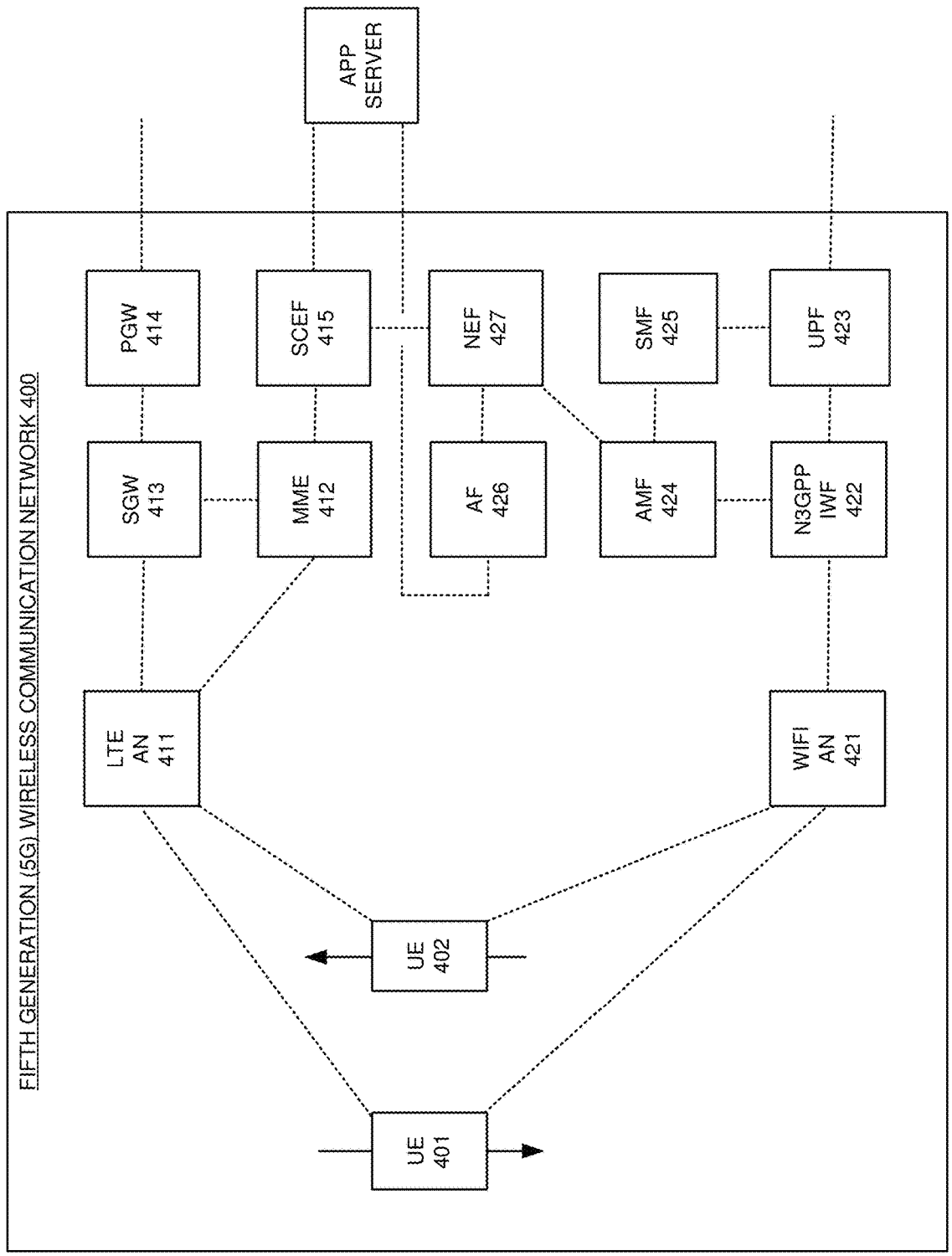
FIG. 4 illustrates a Fifth Generation (5G) wireless communication network to handover UEs between an IEEE 802.11 (WIFI) access node and a Long Term Evolution (LTE) access node.

FIG. 4 illustrates Fifth Generation (5G) wireless communication network 400 to handover UEs 401-402 between Long Term Evolution Access Node (LTE AN) 411 and IEEE 802.11 Access Node (WIFI AN) 421. 5G wireless communication network 400 comprises an example of wireless communication networks 110 and 120, although networks 110 and 120 may vary from this example. 5G wireless communication network 400 comprises UEs 401-402, LTE AN 411, Mobility Management Entity (MME) 412, Serving Gateway (SGW) 413, Packet Data Network Gateway (PGW) 414, Service Capability Exposure Function (SCEF) 415, WIFI AN 421, Non-3GPP Interworking Function (N3IWF) 422, User Plane Function (UPF) 423, Access and Mobility Management Function (AMF) 424, Session Management Function (SMF) 425, Application Function (AF) 426, and Network Exposure Function (NEF) 427.

Initially, SCEF 415 receives UE instructions (INST) from an external app server for UEs 401-402. AF 426 also receives UE instructions for UEs 401-402 from the external app server and transfers the user instructions to NEF 427. The UE instructions relate to hand-overs between LTE AN 411 to WIFI AN 421.

UE 401 attaches to LTE AN 411 and registers with MME 412 over LTE AN 411. MME 412 determines UE context for UE 101 like user ID, International Mobile Subscriber ID (IMSI), Public Land Mobile Network (PLMN) ID, Physical Cell ID (PCI), Access Point Names, (APNs), Quality-of-Service Class Indicators (QCIs), Internet Protocol (IP) addresses, IP Multimedia Subsystem (IMS) information, roaming policies, and/or some other networking data. MME 112 transfers S1-MME signaling to LTE AN 411 and transfers S11 signaling to SGW 413 to serve UE 401 per the UE context. LTE AN 411 transfers NAS signaling with the UE context to UE 401. SGW 413 transfers S5 signaling to PGW 424 to serve UE 401 per the UE context. UE 401 and LTE AN 411 wirelessly exchange user data per the network signaling and the UE context. LTE AN 411 and SGW 413 exchange S1-U data per the network signaling and the UE context. SGW 413 and PGW 414 exchange S5 data per the network signaling and the UE context. PGW 414 and external systems exchange the SGi data per the network signaling and the UE context.

As UE 401 moves away from LTE AN 411 and toward WIFI AN 421, UE 401 detects a Service Set ID (SSID) for WIFI AN 421 and reports to MME 412 over LTE AN 411. The report indicates poor signal strength from LTE AN 411 and better signal strength from WIFI AN 421 over the SSID. In response to the UE report, MME 112 detects the hand-over of UE 401 from LTE AN 411 to WIFI AN 421, and in response to the handover, MME 412 transfers the UE context for UE 401 to SCEF 415 for delivery to NEF 427. In response to the UE context transfer, SCEF 415 also transfers the user instructions from the app server to NEF 427 along with the UE context.

UE 401 attaches to WIFI AN 421. UE 401 registers with AMF 424 over WIFI AN 421 and N3IWF 422. UE 401 indicates the UE context to AMF 424 during the registration—although the UE context from UE 401 is authorized. AMF 424 transfers a UE context request for UE 401, WIFI AN 421, and LTE AN 411 to NEF 427. NEF 427 translates the UE context and the UE instructions into a format suitable for AMF 424. NEF 427 transfers the UE context and UE instructions for UE 401 to AMF 424. The UE context from NEF 427 is authorized.

AMF 424 processes the UE context and UE instructions and responsively transfers the UE instructions to UE 401 over the N1 that traverses N3GPP IWF 422 and WIFI AN 421. AMF 424 and SMF 425 exchange N11 signaling based on the UE context and UE instructions. AMF 424 and N3IWF 422 exchange N2 signaling based on the UE context and UE instructions. AMF 424 and UE 401 exchange N1 signaling based on the UE context and UE instructions over AN 421 and N3IWF 422. SMF 425 and UPF 423 exchange N4 signaling based on the UE context and UE instructions. N3IWF 422 and WIFI AN 421 may exchange network signaling based on the UE context and instructions. UE 401 and WIFI AN 421 wirelessly exchange user data per the signaling which is based on the UE context and instructions. WIFI AN 421 and N3IWF 422 exchange user data per the signaling which is based on the UE context and instructions. N3IWF 422 and UPF 423 exchange N3 data per the signaling which is based on the UE context and instructions. UPF 423 and external systems exchange N6 data per the signaling which is based on the UE context and instructions.

UE 402 attaches to WIFI AN 421 and registers with AMF 424 over WIFI AN 421. AMF 424 determines UE context for UE 402 like user ID, IMSI, PLMN ID, SSID, PCI, Data Network Names, (DNNs), slice IDs, Quality-of-Service Flow Indicators (QFIs), IP addresses, IMS information, roaming policies, and/or some other networking data. AMF 424 transfers N2 signaling to N3IWF 422 and transfers N11 signaling to SMF 425 to serve UE 402 per the UE context. N3IWF 422 may transfer network signaling to WIFI AN 421 to serve UE 402 per the UE context. AMF 424 transfers N1 signaling with the UE context to UE 401. SMF 425 transfers N4 signaling to UPF 423 to serve UE 402 per the UE context. UE 402 and WIFI AN 421 wirelessly exchange user data per the network signaling and the UE context. WIFI AN 421 and IWF 422 exchange NWu data per the network signaling and the UE context. IWF 422 and UPF 423 exchange N3 data per the network signaling and the UE context. UPF 423 and external systems exchange the user data per the network signaling and the UE context.

As UE 402 moves away from WIFI AN 421 and toward LTE AN 411, UE 402 detects a PCI for LTE AN 411 and reports to AMF 424 over WIFI AN 421 and N3IWF 422. The report indicates poor signal strength from WIFI AN 421 and better signal strength from LTE AN 411 over the PCI. In response to the UE report, AMF 424 detects the hand-over of UE 402 from WIFI AN 421 to LTE AN 411. In response to the handover, AMF 424 transfers the UE context to NEF 427 for delivery to SCEF 415. In response to the UE context transfer, NEF 427 transfers the UE instructions from AF 426 to SCEF 415 along with the UE context.

UE 402 attaches to LTE AN 411. UE 401 registers with MME 412 over LTE AN 411. UE 402 indicates the UE context to MME 412 during the registration—although the UE context from UE 402 is not authorized. MME 412 transfers a UE context request for UE 402, LTE AN 411, and WIFI AN 421 to SCEF 415. SCEF 415 translates the UE context and the UE instructions into a format suitable for MME 412. SCEF 415 transfers the UE context and UE instructions for UE 402 to MME 412. The UE context from SCEF 415 is authorized. MME 412 processes the UE context and UE instructions and responsively transfers the UE instructions to UE 402 over LTE AN 411. MME 412 and SGW 413 exchange S11 signaling based on the UE context and UE instructions. MME 412 and LTE AN 411 exchange S1-MME signaling based on the UE context and UE instructions. MME 412 and UE 402 exchange NAS signaling based on the UE context and UE instructions over LTE AN 411. SGW 413 and PGW 414 exchange S5 signaling based on the UE context and UE instructions. UE 402 and LTE AN 411 wirelessly exchange user data per the signaling which is based on the UE context and instructions. LTE AN 411 and SGW 413 exchange the S1-U data per the signaling which is based on the UE context and instructions. SGW 413 and PGW 414 exchange S5 data per the signaling which is based on the UE context and instructions. PGW 414 and external systems exchange SGi data per the signaling which is based on the UE context and instructions.

WIFI AN 421 is untrusted in this example. In other examples, WIFI AN 421 may comprise a Trusted Network Access Point (TNAP) that communicates with a Trusted Network Gateway Function (TNGF). The TNGF would operate and interact with WIFI AN 421, UPF 423 and AMF 424 in a similar manner to N3IWF 422.

Figure 5:
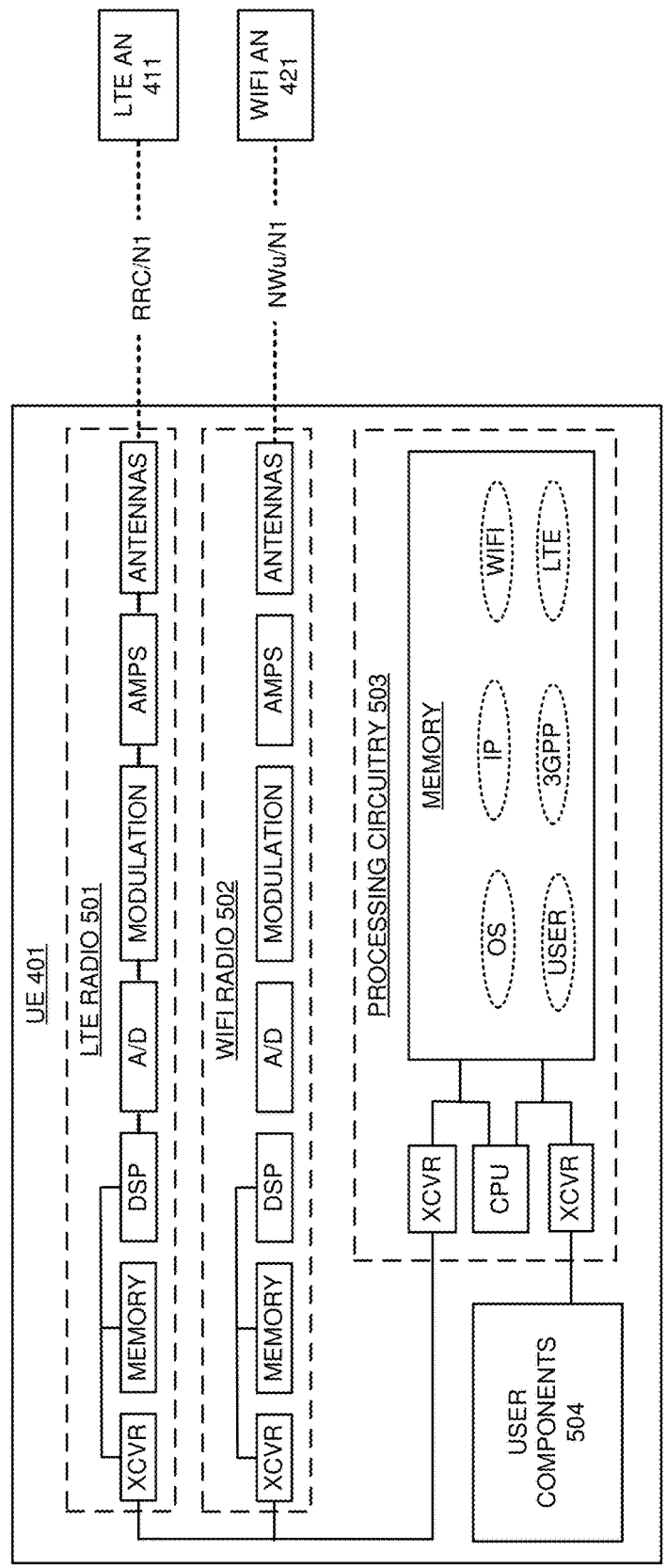
FIG. 5 illustrates the UE in the 5G wireless communication network.

FIG. 5 illustrates UE 401 in 5G wireless communication network 400. UE 401 comprises an example of UE 101, although UE 101 may differ. UE 402 could be similar to UE 401. UE 401 comprises LTE radio 501, WIFI radio 502, processing circuitry 503, and user components 504. Radios 501-502 comprise antennas, amplifiers, filters, modulation, analog-to-digital interfaces, DSP, memory, and transceivers that are coupled over bus circuitry. Processing circuitry 503 comprises memory, CPU, user interfaces and components, and transceivers that are coupled over bus circuitry. The memory in processing circuitry 503 stores an operating system, user applications (USER), and network applications for IP, 3GPP, WIFI, and LTE. The network applications include physical layer, media access control, link control, convergence and adaption, radio resource control, and the like. The antennas in LTE radio 501 are wirelessly coupled to LTE AN 411 over an LTE link that supports RRC and N1. The antennas in WIFI radio 502 are wirelessly coupled to WIFI AN 421 over a WIFI link that supports NWu and N1. Transceivers (XCVRs) in radios 501-502 are coupled to transceivers in processing circuitry 503. Transceivers in processing circuitry 503 are coupled to user components 504 like displays, controllers, and memory. The CPU in processing circuitry 503 executes the operating system, user applications, and network applications to exchange network signaling and user data with ANs 411 and 421 over respective radios 501-502.

Figure 6:
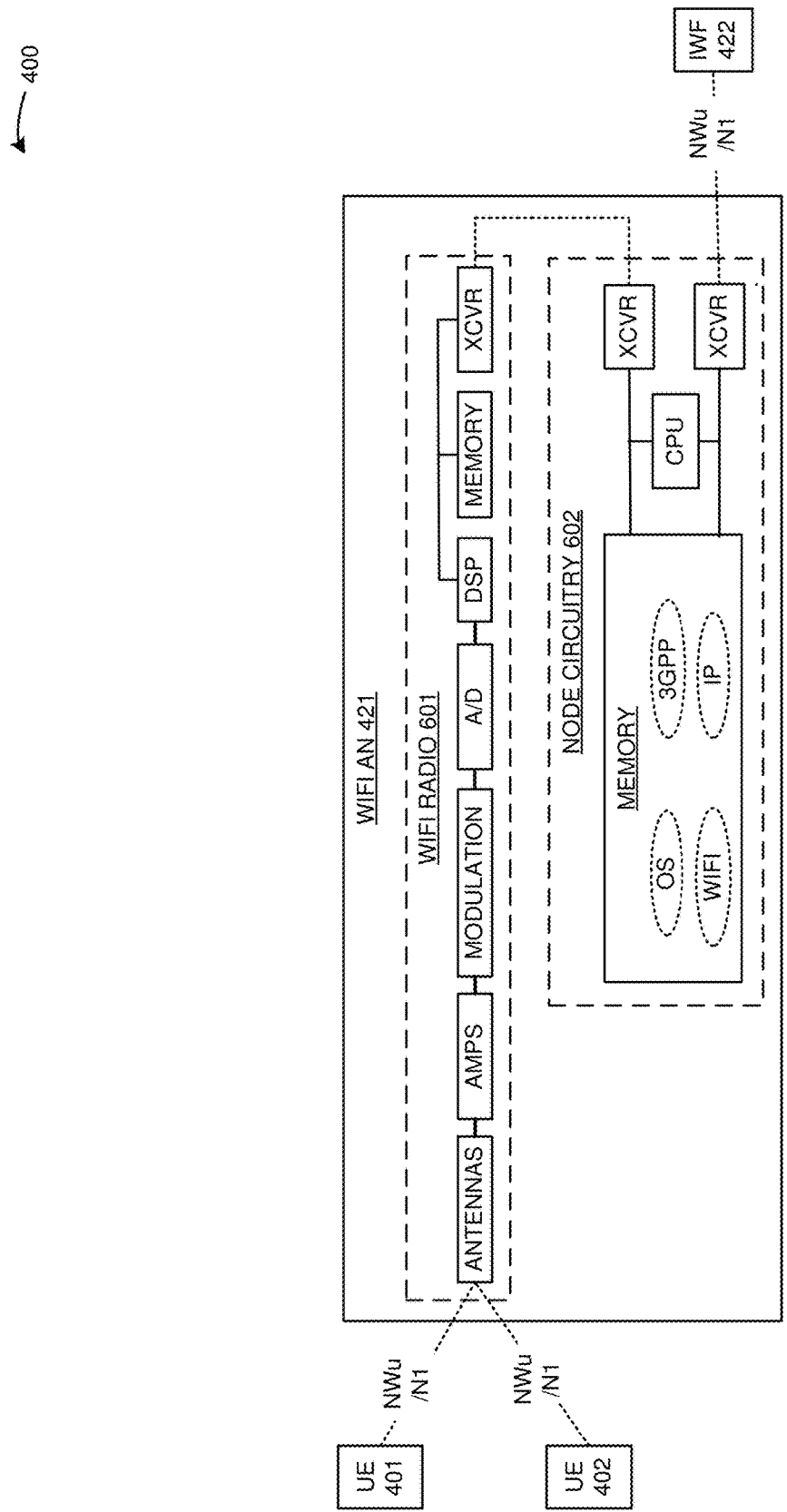
FIG. 6 illustrates the WIFI access node in the 5G wireless communication network.

FIG. 6 illustrates IEEE 802.11 (WIFI) access node 421 in 5G wireless communication network 400. WIFI AN 421 comprises an example of non-3GPP access node 121, although access node 121 may differ. WIFI AN 421 also comprises an example of an access point in wireless communication network 110, although network 110 may differ. WIFI AN 421 comprises WIFI radio 601 and node circuitry 602. Radio 601 comprises antennas, amplifiers, filters, modulation, analog-to-digital interfaces, DSP, memory, and transceivers that are coupled over bus circuitry. Node circuitry 602 comprises memory, CPU, and transceivers that are coupled over bus circuitry. The memory in node circuitry 602 stores operating systems and network applications for IP, WIFI, and 3GPP like physical layer, media access control, link control, and the like. The antennas in WIFI radio 601 are wirelessly coupled to UEs 401-402 over wireless links that support NWu and N1. Transceivers in WIFI radio 601 are coupled to transceivers in node circuitry 602, and transceivers in node circuitry 602 are coupled to transceivers in N3IWF 421 over links that support NWu and N1. The CPU in node circuitry 602 executes the operating system and network applications to exchange data and signaling with UEs 401-402 and to exchange data and signaling with N3IWF 421. WIFI AN 421 could be configured with additional 3GPP trust software to comprise a TNAP.

Figure 7:
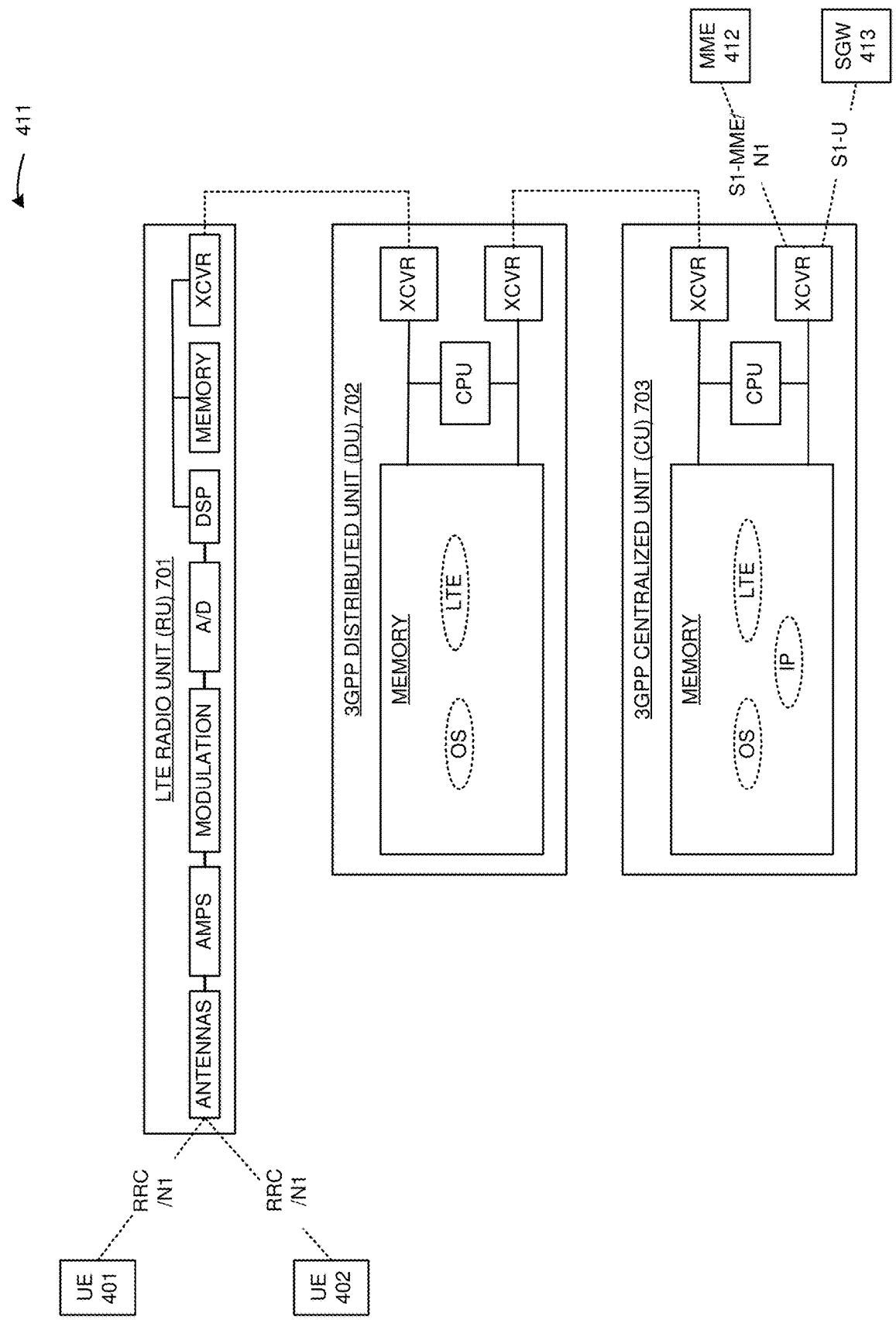
FIG. 7 illustrates the LTE access node in the 5G wireless communication network.

FIG. 7 illustrates LTE access node 411 in 5G wireless communication network 400. LTE access node 411 comprises an example of an access node in wireless communication network 110, although network 110 may differ. LTE access node 411 comprises LTE Radio Unit (RU) 701, 3GPP Distributed Unit (DU) 702, and 3GPP Centralized Unit (CU) 703. LTE RU 701 comprises antennas, amplifiers, filters, modulation, analog-to-digital interfaces, DSP, memory, and transceivers that are coupled over bus circuitry. DU 702 comprises memory, CPU, and transceivers that are coupled over bus circuitry. The memory in DU 702 stores operating systems and LTE network applications that include physical layer, media access control, radio link control, and the like. CU 703 comprises memory, CPU, and transceivers that are coupled over bus circuitry. The memory in CU 703 stores an operating system and network applications for IP and LTE that include packet data convergence protocol, service data adaptation protocol, radio resource control, and the like. The antennas in RU 701 are wirelessly coupled to UEs 401-402 over LTE links that support RRC and N1. Transceivers in RU 701 are coupled to transceivers in DU 702 over fronthaul links like enhanced Common Public Radio Interface (eCPRI). Transceivers in DU 702 coupled to transceivers in CU 703 over mid-haul links. Transceivers in CU 703 are coupled to MME 412 and SGW 413 over backhaul links. The CPU in DU 703 executes an operating system and network applications to exchange LTE data units with RU 701 and to exchange LTE data units with CU 703. The CPU in CU 703 executes an operating system and network applications to exchange the LTE data units with DU 702, exchange S1-MME signaling with AMF 412, and exchange S1-U data with SGW 413.

Figure 8:
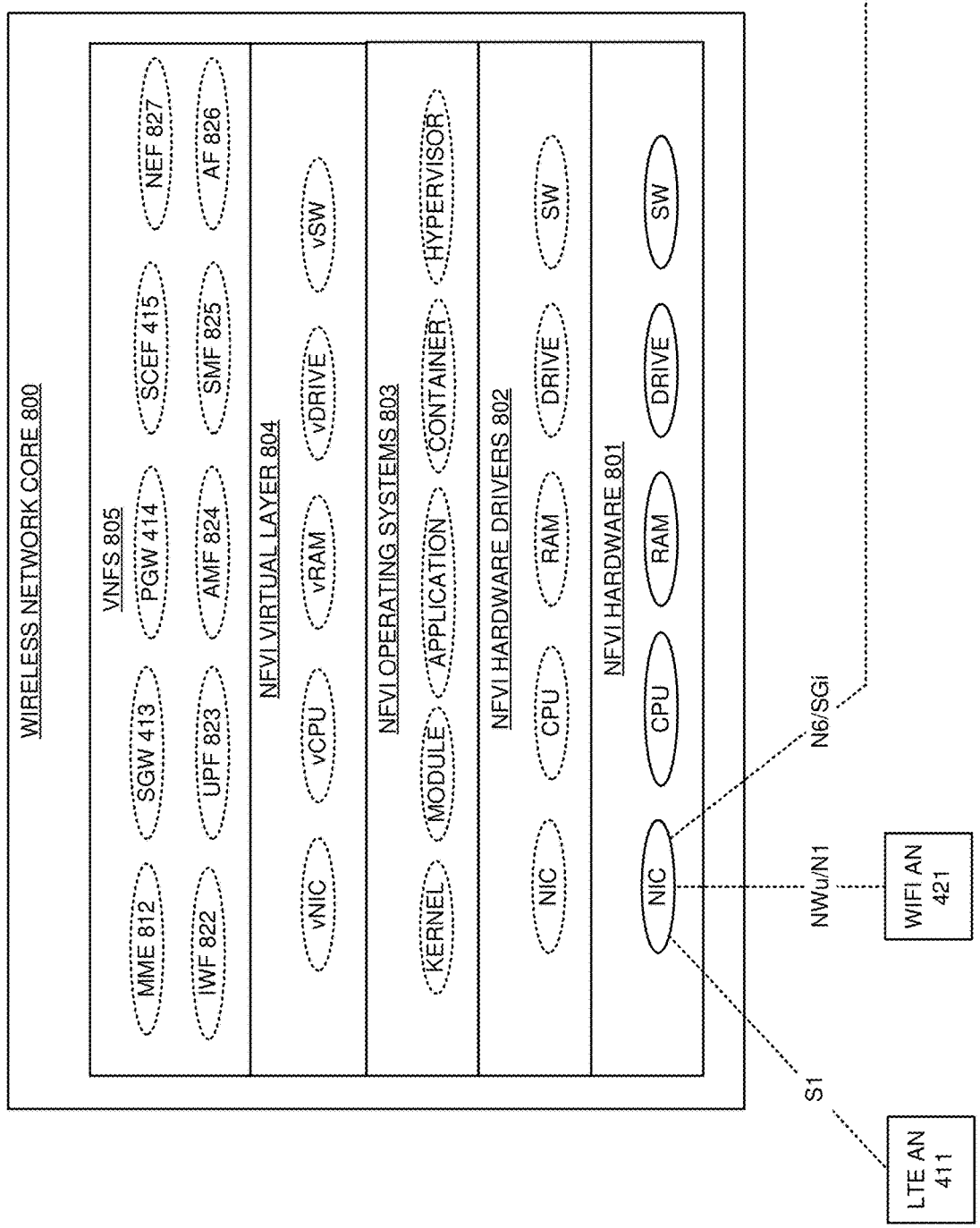
FIG. 8 illustrates a wireless network core in the 5G wireless communication network.

FIG. 8 illustrates wireless network core 800 in 5G wireless communication network 400. Network core 800 comprises an example of wireless communication network 100, NEF 124, AMF 123, and network functions 122, although network 100, NEF 124, AMF 123, and functions 122 may differ. Network core 800 comprises Network Function Virtualization Infrastructure (NFVI) hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, RAM, Flash/Disk Drives (DRIVE), and Data Switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises vNIC, vCPU, vRAM, vDRIVE, and vSW. NFVI VNFs 805 comprise Mobility Management Entity (MME) 812, Serving Gateway (SGW) 813, Packet Data Network Gateway (PGW) 814, Service Capability Exposure Function (SCEF) 815, Non-3GPP Interworking Function (N3IWF) 822, User Plane Function (UPF) 823, Access and Mobility Management Function (AMF) 824, Session Management Function (SMF) 825, Application Function (AF) 826, and Network Exposure Function (NEF) 827. Other VNFs like Authentication Server Function (AUSF) and Network Repository Function (NRF) are typically present but are omitted for clarity. Network core 800 may be located at a single site or be distributed across multiple geographic locations. The NIC in NFVI hardware 801 are coupled to ANs 412 and 421 over data links that support S1, NWu, and N1. NFVI hardware 801 executes NFVI hardware drivers 802, NFVI operating systems 803, NFVI virtual layer 804, and NFVI VNFs 805 to form and operate MME 812, SGW 813, PGW 814, SCEF 815, N3IWF 822, UPF 823, AMF 824, SMF 825, AF 826, and NEF 827. In some examples, VNFs 805 include a TNGF VNF that is executed to form and operate a TNGF that communicates with a TNAP.

Figure 9:
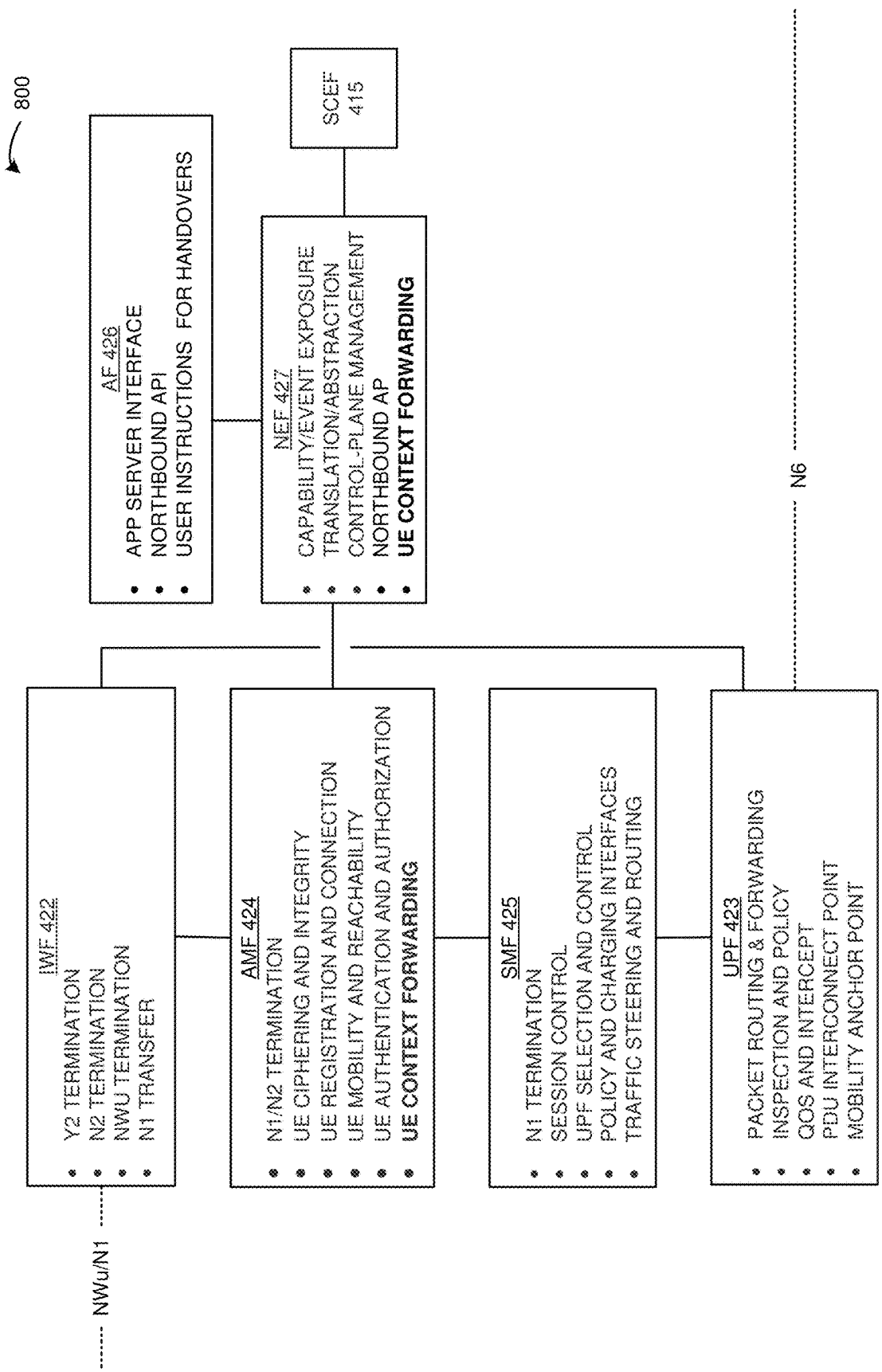
FIG. 9 further illustrates the wireless network core in the 5G wireless communication network.

FIG. 9 further illustrates wireless network core 800 in 5G wireless communication network 400. IWF 422 performs Y2 termination, N2 termination, NWu termination, and N1 transfer. UPF 423 performs packet routing forwarding, packet inspection and policy, QoS handling and lawful intercept, PDU interconnection, and mobility anchoring. AMF 424 performs N1 termination, N2 termination, UE ciphering & integrity protection, UE registration and connection, UE mobility and reachability, UE authentication and authorization, and UE context forwarding. SMF 425 performs N1 termination, session establishment/management, UPF selection and control, policy and charging control, and frame steering and routing. AF 426 performs interactions with external app servers, and NEF interaction over the Northbound Application Programming Interface (API). NEF 427 performs capability and event exposure, data translation/abstraction, control-plane management, AF interaction over the northbound API, and UE context forwarding.

Figure 10:
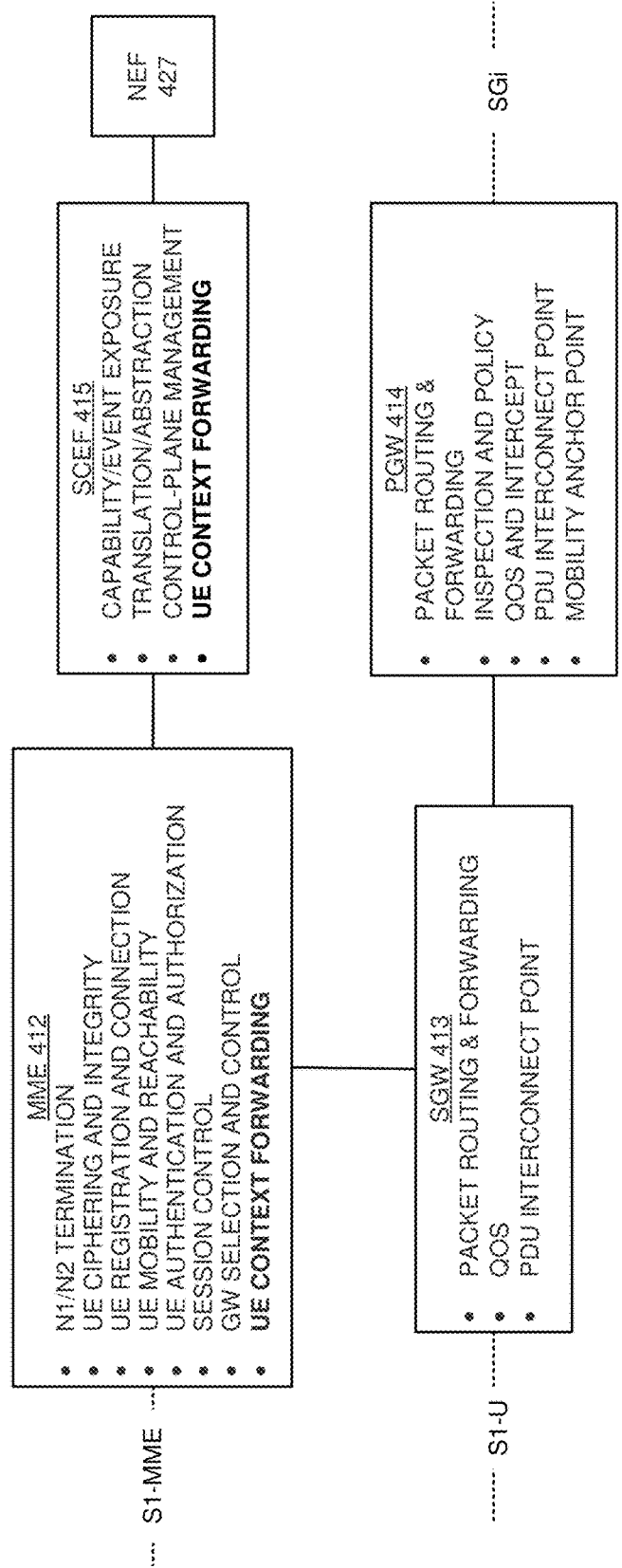
FIG. 10 further illustrates the wireless network core in the 5G wireless communication network.

FIG. 10 further illustrates wireless network core 800 in 5G wireless communication network 400. MME 412 performs S1 termination, Non-Access Stratum (NAS) termination, UE ciphering & integrity protection, LIE registration and connection, LIE mobility and reachability, LIE authentication and authorization, session establishment/management, GW selection and control, and UE context forwarding. SGW 413 performs packet routing & forwarding, QoS handling, and PDU interconnection. PGW 414 performs packet routing & forwarding, packet inspection and policy, QoS handling and lawful intercept, PDU interconnection, and mobility anchoring. SCEF 415 performs capability and event exposure, data translation/abstraction, control-plane management. NEF interaction, and UE context forwarding.

Figure 11:
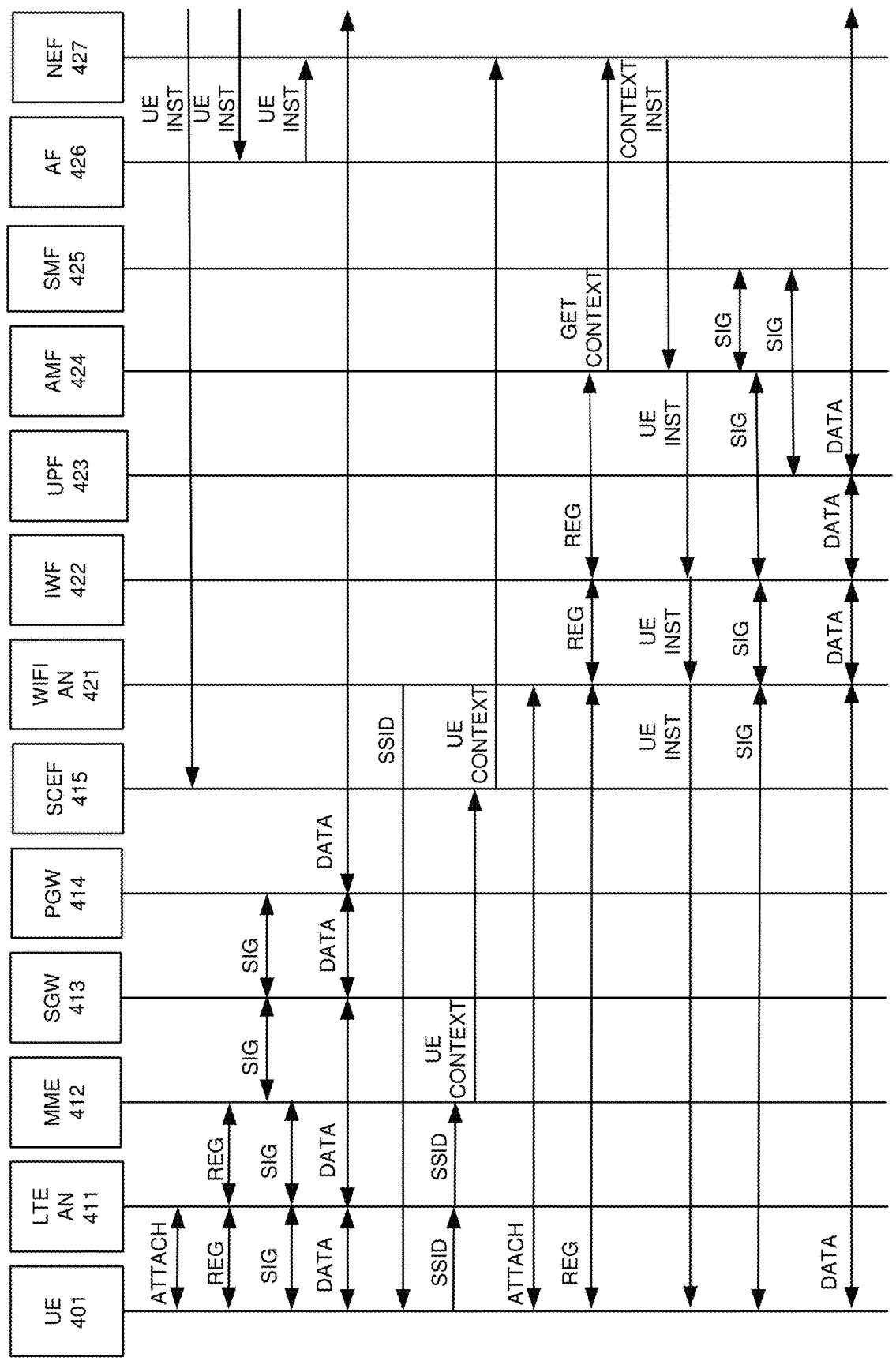
FIG. 11 illustrates an exemplary operation of the 5G wireless communication network to handover the UE from the LTE access node to the WIFI access node.

FIG. 11 illustrates an exemplary operation of 5G wireless communication network 400 to handover UE 401 from LTE access node 411 to WIFI access node 421. The operation may vary in other examples. SCEF 415 receives UE instructions (INST) from an external app server for UEs 401-402. AF 426 also receives UE instructions for UEs 401-402 from the external app server and transfers the user instructions to NEF 427. The UE instructions relate to hand-overs between LTE AN 411 to WIFI AN 421. UE 401 attaches to LTE AN 411 and registers with MME 412 over LTE AN 411.

MME 412 determines UE context for UE 101 like user ID, IMSI, PLMN ID, PCI, APNs, QCIs, IP addresses, IMS information, roaming policies, and/or some other networking data. MME 412 transfers S1-MME signaling to LTE AN 411 and transfers S11 signaling to SGW 413 to serve UE 401 per the UE context. LTE AN 411 transfers RRC signaling with the UE context to UE 401. SGW 413 transfers S5 signaling to PGW 424 to serve UE 401 per the UE context. UE 401 and LTE AN 411 wirelessly exchange RRC data per the network signaling and the UE context. LTE AN 411 and SGW 413 exchange S1-U data per the network signaling and the UE context. SGW 413 and PGW 414 exchange S5 data per the network signaling and the UE context. PGW 414 and external systems exchange SGi data per the network signaling and the UE context.

UE 401 detects a Service Set ID (SSID) for WIFI AN 421 and reports to MME 412 over LTE AN 411. The report indicates poor signal strength from LTE AN 411 and better signal strength from WIFI AN 421 over the SSID. In response to the UE report, MME 112 detects the hand-over of UE 401 from LTE AN 411 to WIFI AN 421, and in response to the handover, MME 412 transfers the UE context for UE 401 to SCEF 415 for delivery to NEF 427. SCEF 415 transfers the user instructions from the app server to NEF 427 along with the UE context.

UE 401 attaches to WIFI AN 421. UE 401 registers with AMF 424 over WIFI AN 421 and N3IWF 422. UE 401 indicates the UE context to AMF 424 during the registration—although the UE context from UE 401 is not authorized. AMF 424 transfers a UE context request for UE 401, WIFI AN 421, and LTE AN 411 to NEF 427. NEF 427 translates the UE context and the UE instructions into a format suitable for AMF 424. NEF 427 transfers the UE context and UE instructions for UE 401 to AMF 424. The UE context from NEF 427 is authorized.

AMF 424 processes the UE context and UE instructions and responsively transfers the UE instructions to UE 401 over N3GPP IWF 422 and WIFI AN 421. AMF 424 and SMF 425 exchange N11 signaling based on the UE context and UE instructions. AMF 424 and N3IWF 422 exchange N2 signaling based on the UE context and UE instructions. AMF 424 and UE 401 exchange N1 signaling based on the UE context and UE instructions over AN 421 and N3IWF 422. SMF 425 and UPF 423 exchange N4 signaling based on the UE context and UE instructions. N3IWF 422 and WIFI AN 421 may exchange network signaling based on the UE context and instructions. UE 401 and WIFI AN 421 wirelessly exchange WIFI data per the signaling which is based on the UE context and instructions. WIFI AN 421 and N3IWF 422 exchange NWu data per the signaling which is based on the UE context and instructions. N3IWF 422 and UPF 423 exchange N3 data per the signaling which is based on the UE context and instructions. UPF 423 and external systems exchange N6 data per the signaling which is based on the UE context and instructions.

Figure 12:
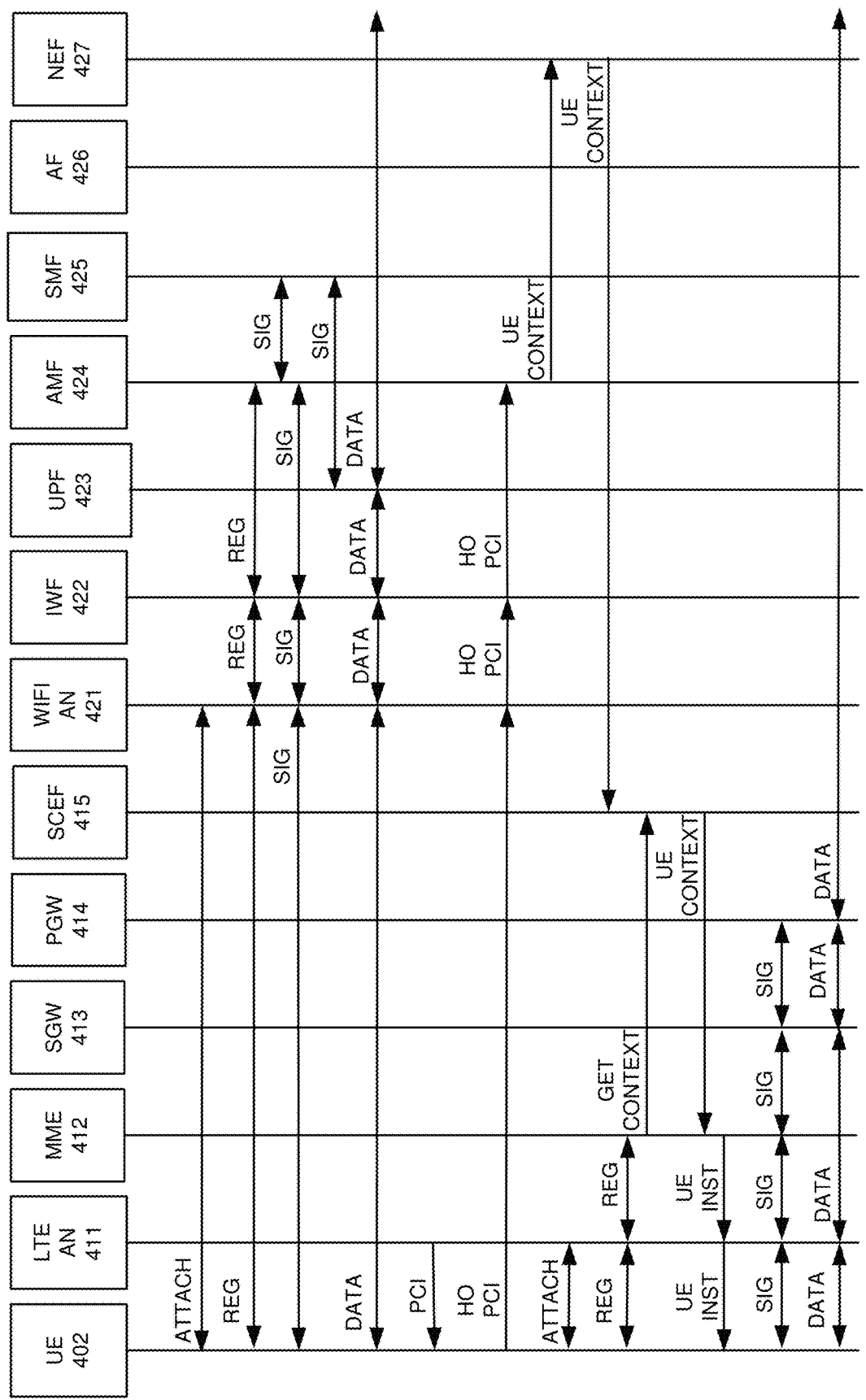
FIG. 12 illustrates an exemplary operation of the 5G wireless communication network to handover the UE from the WIFI access node to the LTE access node.

FIG. 12 illustrates an exemplary operation of 5G wireless communication network 400 to handover UE 402 from WIFI access node 421 to LTE access node 411. The operation may vary in other examples. UE 402 attaches to WIFI AN 421 and registers with AMF 424 over WIFI AN 421. AMF 424 determines UE context for UE 402 like user ID, IMSI, PLMN ID, SSID, PCI, Data Network Names, (DNNs), slice IDs, Quality-of-Service Flow Indicators (QFIs), IP addresses, IMS information, roaming policies, and/or some other networking data. AMF 424 transfers N2 signaling to N3IWF 422 and transfers N11 signaling to SMF 425 to serve UE 402 per the UE context. N3IWF 422 may transfer network signaling to WIFI AN 421 to serve UE 402 per the UE context. AMF 424 transfers N1 signaling with the UE context to UE 402. SMF 425 transfers N4 signaling to UPF 423 to serve UE 402 per the UE context. UE 402 and WIFI AN 421 wirelessly exchange WIFI data per the network signaling and the UE context. WIFI AN 421 and IWF 422 exchange NWu data per the network signaling and the UE context. IWF 422 and UPF 423 exchange N3 data per the network signaling and the UE context. UPF 423 and external systems exchange the user data per the network signaling and the UE context.

UE 402 detects a PCI for LTE AN 411 and reports to AMF 424 over WIFI AN 421 and N3IWF 422. The report indicates poor signal strength from WIFI AN 421 and better signal strength from LTE AN 411 over the PCI. In response to the UE report, AMF 424 detects the hand-over of UE 402 from WIFI AN 421 to LTE AN 411. In response to the handover to LTE AN 411, AMF 424 transfers the UE context to NEF 427 for delivery to SCEF 415. NEF 427 transfers the UE instructions from AF 426 and the UE context to SCEF 415.

UE 402 attaches to LTE AN 411. UE 402 registers with MME 412 over LTE AN 411. UE 402 indicates the UE context to MME 412 during the registration—although this UE context is not authorized. MME 412 transfers a UE context request for UE 402, LTE AN 411, and WIFI AN 421 to SCEF 415. SCEF 415 translates the UE context and the UE instructions into a format suitable for MME 412. SCEF 415 transfers the UE context and UE instructions for UE 401 to MME 412. The UE context from SCEF 415 is authorized. MME 412 processes the UE context and UE instructions and responsively transfers the UE instructions to UE 402 over LTE AN 411. MME 412 and SGW 413 exchange S11 signaling based on the UE context and UE instructions. MME 412 and LTE AN 411 exchange S1-MME signaling based on the UE context and UE instructions. MME 412 and UE 402 exchange NAS signaling based on the UE context and UE instructions over LTE AN 411. SGW 413 and PGW 414 exchange S5 signaling based on the UE context and UE instructions. UE 401 and LTE AN 411 wirelessly exchange RRC data per the signaling which is based on the UE context and instructions. LTE AN 411 and SGW 413 exchange S1-U data per the signaling which is based on the UE context and instructions. SGW 413 and PGW 414 exchange S5 data per the signaling which is based on the UE context and instructions. PGW 414 and external systems exchange SGi data per the signaling which is based on the UE context and instructions.

Figure 13:
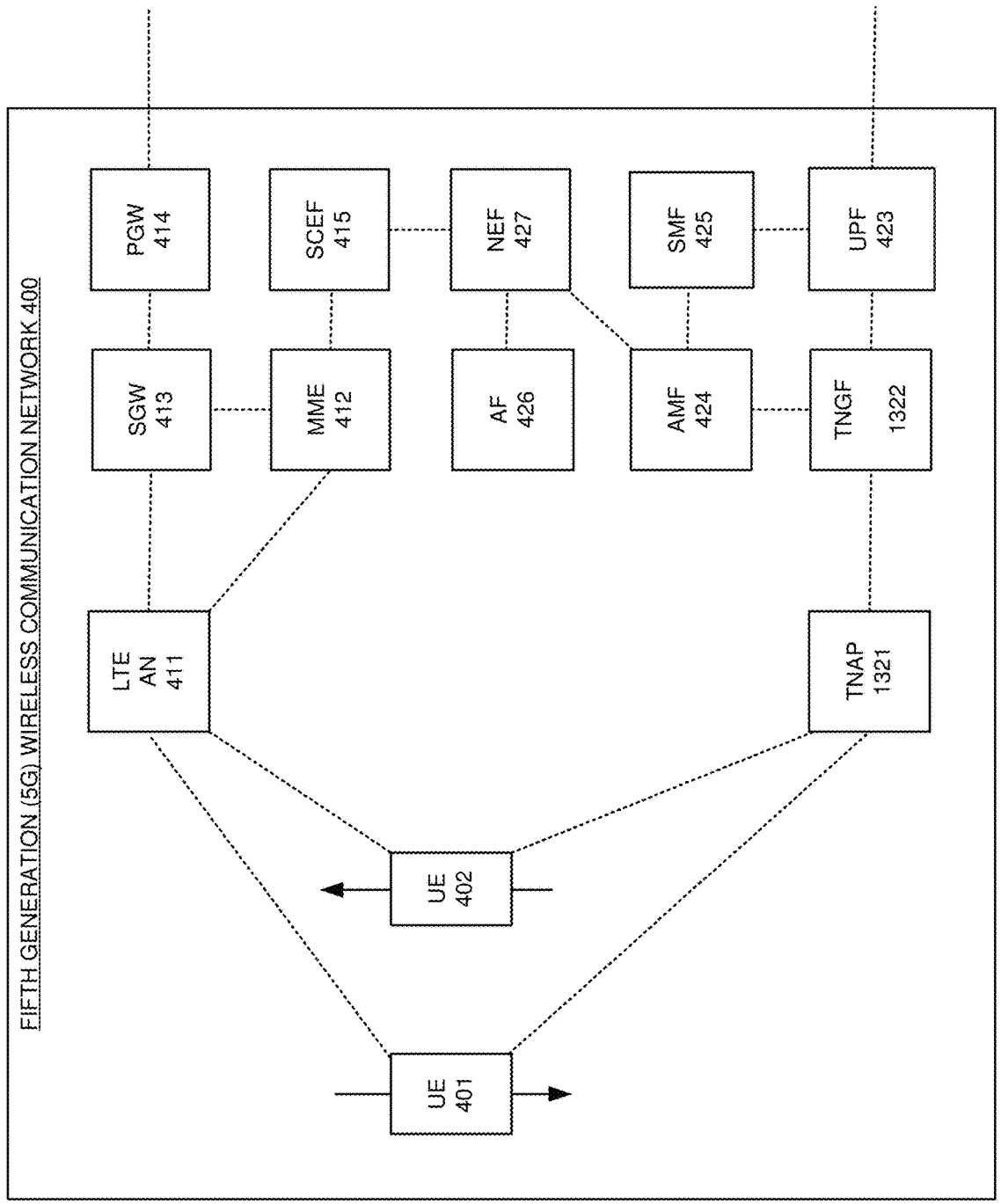
FIG. 13 illustrates a 5G wireless communication network to handover the UE from the LTE access node to a Trusted Network Access Point (TNAP).

FIG. 13 illustrates 5G wireless communication network 400 to handover UE 401 from LTE access node 411 to Trusted Network Access Point (TNAP) 1321. In this example, a WIFI AN like AN 421 is configured with a 3GPP TNAP application to form TNAP 1321. A Trusted Network Gateway Function (TNGF) is executed by network core 800 to form and operate TNGF 1322. For handovers, TNAP 1321 and TNGF 1322 operate and interact with UEs 401-402, UPF 423, and AMF 424 in a similar manner to WIFI AN 421 and N3IWF 422.

Figure 14:
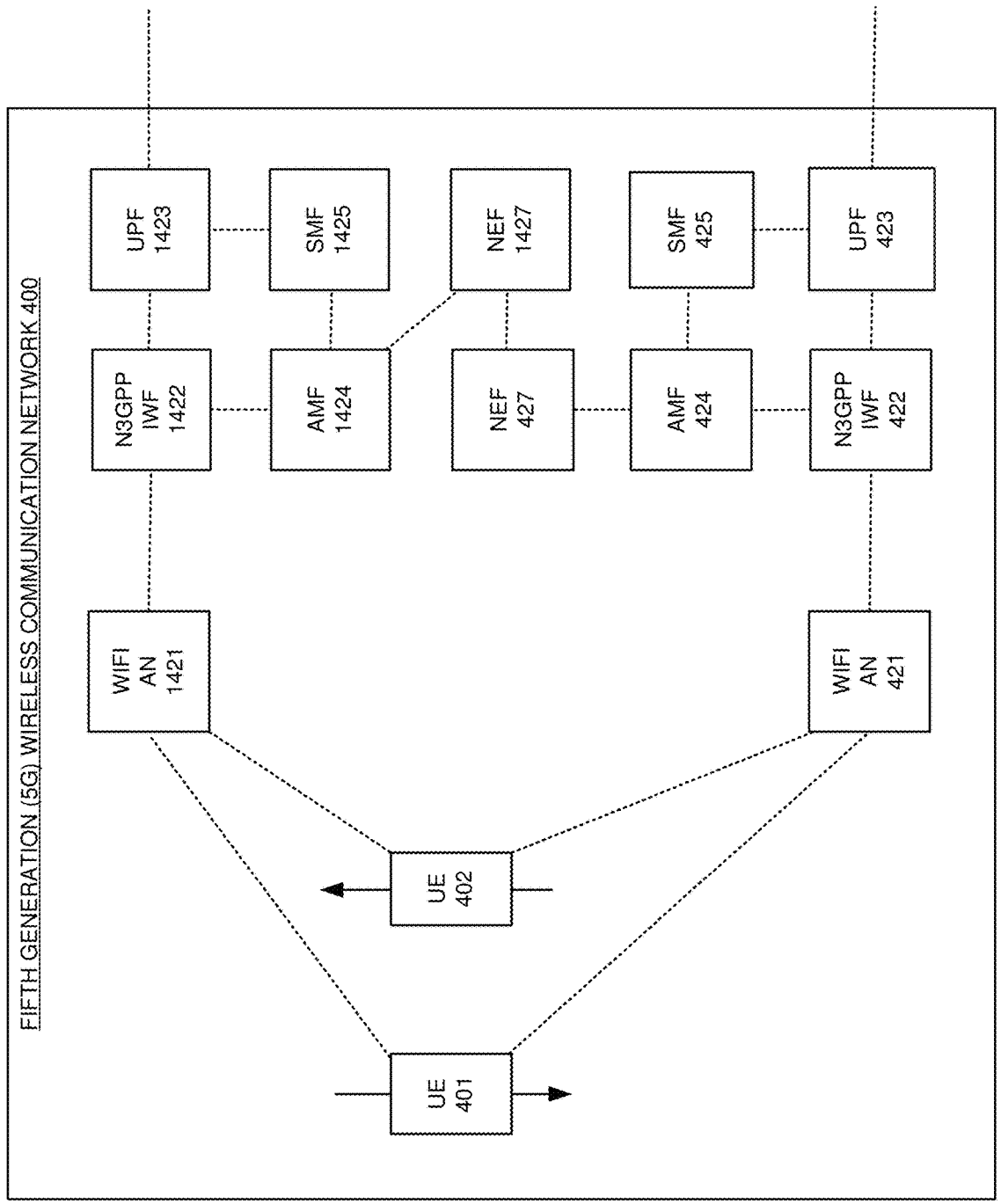
FIG. 14 illustrates a 5G wireless communication network to handover the UE between WIFI access nodes.

FIG. 14 illustrates 5G wireless communication network 400 to handover UE 401 between WIFI AN 421 and WIFI AN 1421. For handovers, WIFI AN 1421, N3IWF 1422, UPF 1423, AMF 1424, SMF 1425, and NEF 1427 are configured and operate like corresponding WIFI AN 421, N3IWF 422, UPF 423, AMF 424, SMF 425, and NEF 427. NEF 427 and NEF 1427 exchange UE context for handovers between the two non-3GPP access nodes—WIFI AN 421 and WIFI AN 1421. Other non-3GPP AN types could be used like bluetooth and ethernet instead of WIFI AN 421 and/or WIFI AN 1421.

The wireless data network circuitry described above comprises computer hardware and software that form special-purpose network circuitry to handover UEs with non-3GPP access nodes. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to handover UEs with non-3GPP access nodes.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to hand-in inbound User Equipment (UE) from a source communication network to a non-Third Partnership Project (non-3GPP) access node, the method comprising:
   a Network Exposure Function (NEF) receiving inbound UE context from the source communication network;
   an Access and Mobility Management Function (AMF) detecting when the inbound UE attaches to the non-3GPP access node to hand-in from the source communication network, and in response, transferring a UE context request for the inbound UE to the NEF;
   the NEF transferring the inbound UE context to the AMF in response to the UE context request; and
   the AMF receiving the inbound UE context and transferring network signaling to one or more network functions to serve the inbound UE based on the inbound UE context.

2. The method of claim 1 further comprising:
   the AMF detecting when an outbound UE de-attaches from the non-3GPP access node to hand-out to a target communication network, and in response, transferring outbound UE context for the outbound UE to the NEF; and
   the NEF receiving the outbound UE context for the UE and transferring the outbound UE context for the UE to the target communication network.

3. The method of claim 1 further comprising:
   the NEF receiving user instructions for the hand-in from an Application Function (AF);
   the NEF transferring the user instructions to the AMF responsive to the UE context request; and
   the AMF transferring the user instructions to the inbound UE in N1 signaling.

4. The method of claim 1 further comprising the AMF transferring N1 signaling to the inbound UE based on the inbound UE context.

5. The method of claim 1 wherein the NEF receiving the inbound UE context from the source communication network and transferring the inbound UE context to the AMF comprises the NEF translating the inbound UE context from the source communication network into the inbound UE context for the AMF.

6. The method of claim 1 wherein the AMF transferring the network signaling to the one or more network functions to serve the inbound UE based on the inbound UE context comprises the AMF transferring N2 signaling to a non-3GPP Interworking Function (IWF) to serve the inbound UE based on the inbound UE context.

7. The method of claim 1 wherein the AMF transferring the network signaling to the one or more network functions to serve the inbound UE based on the inbound UE context comprises the AMF transferring N2 signaling to a Trusted Non-3GPP Gateway Function (TNGF) to serve the inbound UE based on the inbound UE context.

8. The method of claim 1 wherein the AMF transferring the network signaling to the one or more network functions to serve the inbound UE based on the inbound UE context comprises the AMF transferring N11 signaling to a Session Management Function (SMF) to serve the inbound UE based on the inbound UE context.

9. The method of claim 1 wherein the NEF receiving the inbound UE context from the source communication network comprises the NEF receiving the inbound UE context from a Service Capability Exposure Function (SCEF) in the source communication network.

10. The method of claim 1 wherein the non-3GPP access node comprises an Institute of Electrical and Electronic Engineers (IEEE) 802.11 (WIFI) access node.

11. A wireless communication network comprising:
    a Network Exposure Function (NEF) configured to receive inbound UE context from the source communication network;
    an Access and Mobility Management Function (AMF) configured to detect when the inbound UE attaches to the non-3GPP access node to hand-in from the source communication network, and in response, transfer a UE context request for the inbound UE to the NEF;
    the NEF configured to transfer the inbound UE context to the AMF in response to the UE context request; and
    the AMF configured to receive the inbound UE context and transfer network signaling to one or more network functions to serve the inbound UE based on the inbound UE context.

12. The wireless communication network of claim 11 further comprising:
    the AMF configured to detect when an outbound UE de-attaches from the non-3GPP access node to hand-out to a target communication network, and in response, transfer outbound UE context for the outbound UE to the NEF; and
    the NEF configured to receive the outbound UE context for the UE and transfer the outbound UE context for the UE to the target communication network.

13. The wireless communication network of claim 11 further comprising:
    the NEF configured to receive user instructions for the hand-in from an Application Function (AF);
    the NEF configured to transfer the user instructions to the AMF responsive to the UE context request; and
    the AMF configured to transfer the user instructions to the inbound UE in N1 signaling.

14. The wireless communication network of claim 11 further comprising the AMF configured to transfer N1 signaling to the inbound UE based on the inbound UE context.

15. The wireless communication network of claim 11 wherein the NEF is configured to translate the inbound UE context from the source communication network into the inbound UE context for the AMF.

16. The wireless communication network of claim 11 wherein the AMF is configured to transfer N2 signaling to a non-3GPP Interworking Function (IWF) to serve the inbound UE based on the inbound UE context.

17. The wireless communication network of claim 11 wherein the AMF is configured to transfer N2 signaling to a Trusted Non-3GPP Gateway Function (TNGF) to serve the inbound UE based on the inbound UE context.

18. The wireless communication network of claim 11 wherein the AMF is configured to transfer N11 signaling to a Session Management Function (SMF) to serve the inbound UE based on the inbound UE context.

19. The wireless communication network of claim 11 wherein the NEF is configured to receive the inbound UE context from a Service Capability Exposure Function (SCEF) in the source communication network.

20. The wireless communication network of claim 11 wherein the non-3GPP access node comprises an Institute of Electrical and Electronic Engineers (IEEE) 802.11 (WIFI) access node.

* * * * *